Dec. 5, 1939.　　　　E. L. ALDWORTH　　　　2,181,957
THERMOSTATIC CONTROL
Filed July 24, 1937　　　3 Sheets-Sheet 1

Inventor:
Edward L. Aldworth
By Williams, Bradbury, McCaleb & Hinkle
Attys.

Dec. 5, 1939.  E. L. ALDWORTH  2,181,957
THERMOSTATIC CONTROL
Filed July 24, 1937  3 Sheets-Sheet 2

Inventor:
Edward L. Aldworth
By Williams, Bradbury, McCaleb & Hinkle
Attys.

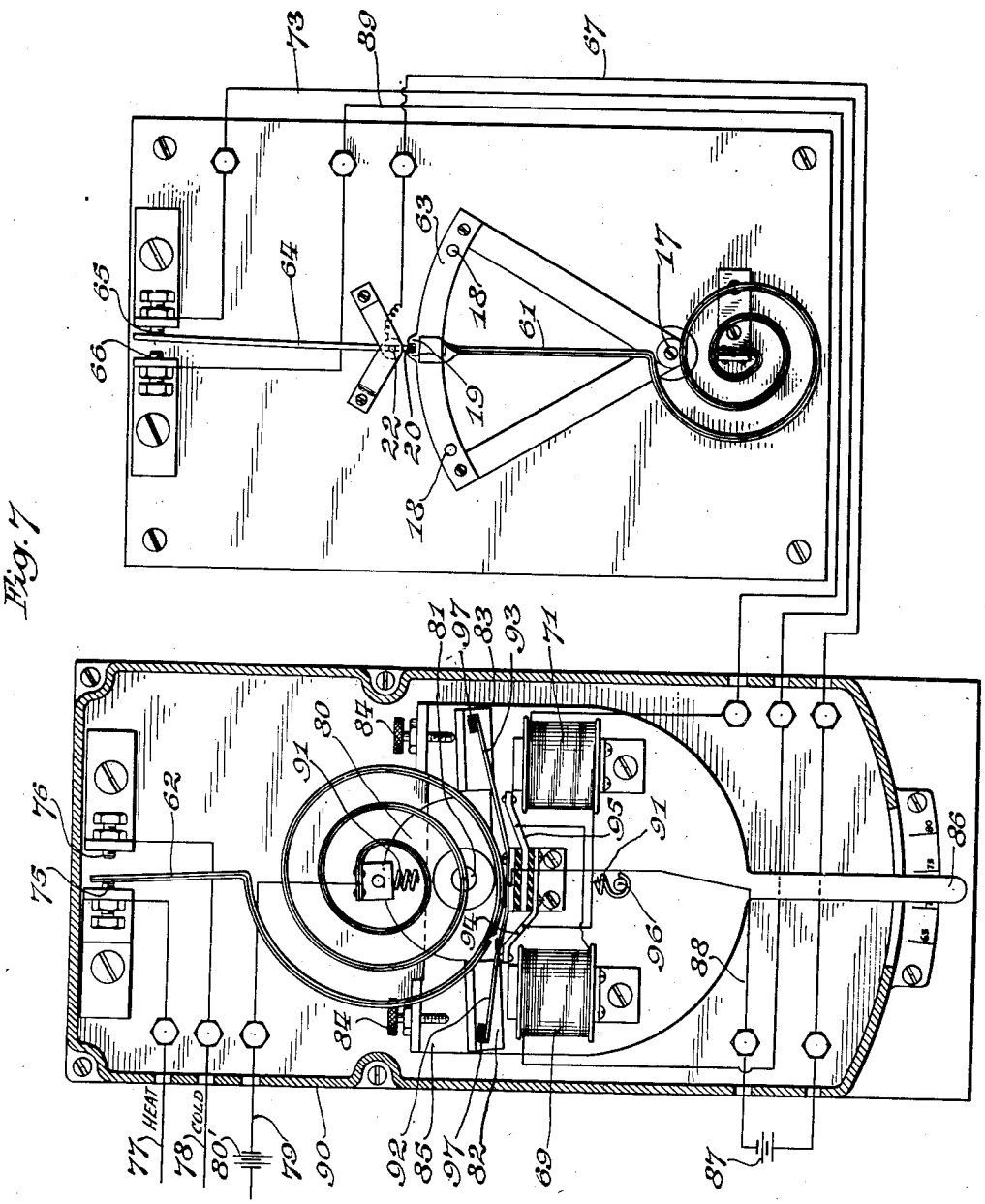

Patented Dec. 5, 1939

2,181,957

UNITED STATES PATENT OFFICE 2,181,957

THERMOSTATIC CONTROL

Edward L. Aldworth, Grand Rapids, Mich.

Application July 24, 1937, Serial No. 155,375

10 Claims. (Cl. 175—320)

This invention relates to thermostatic controls of the general type ordinarily used for controlling heating and cooling systems for buildings.

In general, thermostatic controls are subject to overrunning. That is, for example, in the case of a heater controlling the temperature of building, the thermostat is actuated when the building reaches a certain minimum temperature. The result of this actuation is that the heater is put into operation so as to supply heat to the building, or in some cases the rate of supplying heat to the building is increased. Nevertheless there is a lag after the actuation of the thermostat during which the temperature continues to decrease and this lag or overrun persists until heat is being supplied to the building at the same rate at which it is lost. Thereafter the temperature rises and when it attains a certain point, the heater is rendered inoperative or is damped. Nevertheless there is a further overrun in which the temperature increases after the thermostat actuates the controls. The thermostat is normally set to operate at temperature points which are spaced somewhat apart. Thus, the heater may be turned on at 70° F. and may be turned off at 72° F. This temperature range in addition to the overrun, when both sides are off, provides a variation of temperature which is objectionable.

According to the present invention, I provide an improved thermostatic control in which the overruns on both sides of the temperature range for which the thermostatic device is set, are considerably diminished and in some cases completely eliminated. My improved thermostatic control is adapted in most advantageous circumstances to provide a slight variation of building temperature wholly within, and in some cases, considerably less than the temperature range for which the control is set.

It must be understood that the thermostatic control is capable of being used with any type of heater or cooler. Thus, in the case of gas or oil heat, the thermostat at one point puts the heater into operation, and at the other point terminates the operation of the heater. Where solid fuel is used, the first point corresponds to the opening of the drafts, and the second point corresponds to the closing of the drafts. In case the thermostatic control is used in connection with a cooling device, at one point it starts the supply of cold and the other point it terminates that supply.

The invention will readily be understood from the following description of preferred embodiments thereof, taken in conjunction with the accompanying drawings, in which:

Fig. 7 is a front elevation of a further embodiment of my invention.

Figures 1, 2:
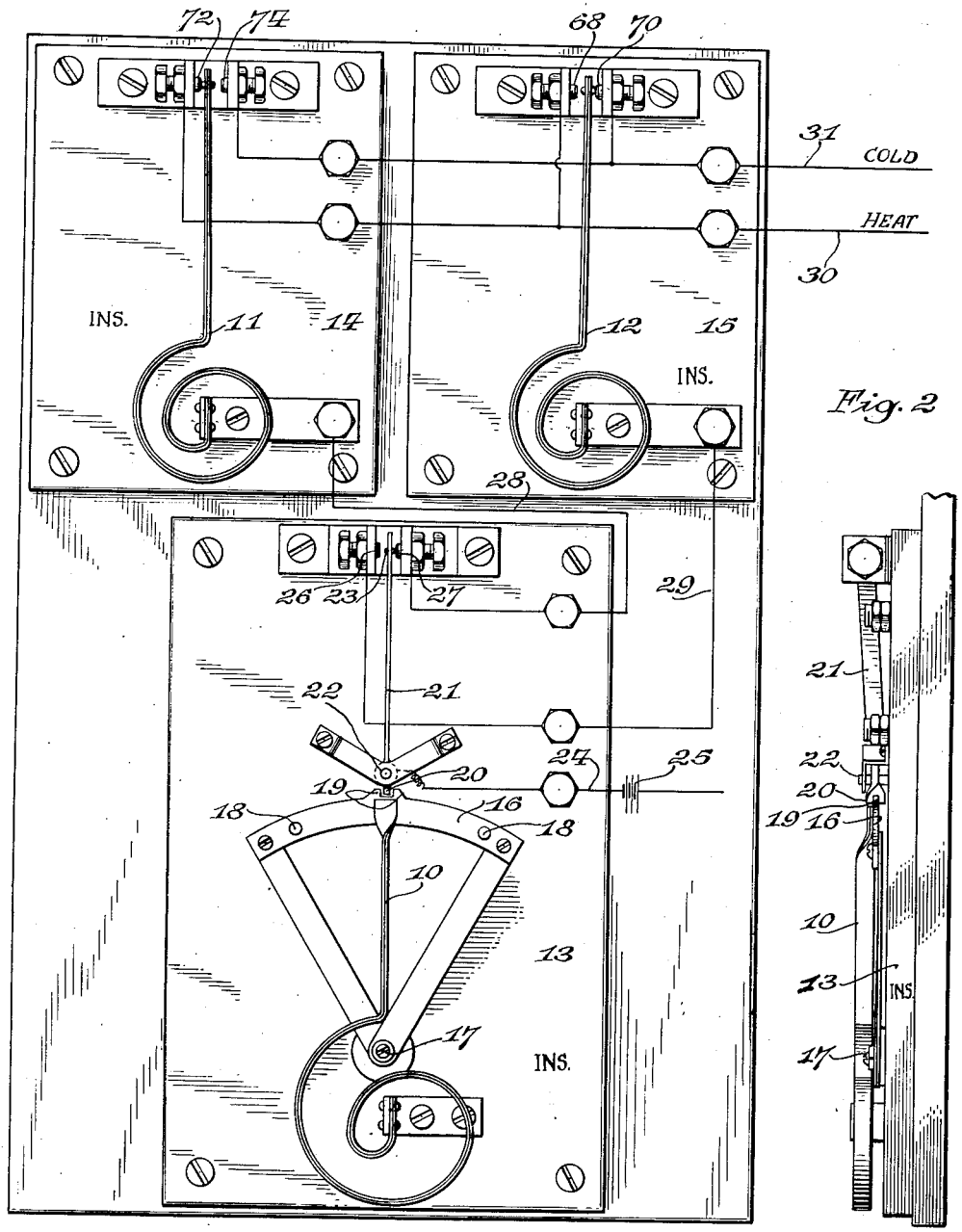
Fig. 1 is a more or less diagrammatic view of a thermostatic control according to my invention.
Fig. 2 is a side elevation of the lower element thereof.

Referring more particularly to Figs. 1 and 2, this embodiment of my invention includes three thermostatic elements, 10, 11 and 12, which are rigidly mounted at one end on bases 13, 14 and 15 respectively and are insulated therefrom. The free end of the thermostatic element 10 is adapted to have a frictional engagement with a sector 16 which is pivotally mounted at 17 on the base 13. The sector 16 may be provided with stops 18 so as to limit the relative movement of the thermostatic element 10 thereon. The periphery of the sector 16 carries a pair of projections 19 which are spaced in close relation so as to receive between them the short end 20 of a lever 21, which is pivotally mounted at 22. Owing to the shortness of the end 20 of the lever 21, which is quite long, the upper end of the lever 21, which carries contacts 23, has a very considerable movement for a slight movement of the lower end 20. The lever 21, which is insulated from the base 13, is connected to a conductor 24 which may include a battery 25 or other source of electrical energy. It may here be noted that the conductor 24 may be the common wire of a three wire control system.

The contacts 23 and the lever 21 are adapted to move between stationary contacts 26 and 27 respectively, which are mounted on the base 13 and insulated therefrom and from each other. The contacts 26 and 27 are spaced apart so that only one of the contacts 23 is in engagement with the contact 26 or the contact 27.

As the temperature falls, the thermostatic element 10 moves to the left and owing to its frictional engagement with the sector 16, it carries the sector along with it to the left. The result is that the lever 21 is thrown to the right so as to bring one of the contacts 23 into engagement with the contact 27. The contact 27 is connected by a conductor 28 to the thermostatic element 11. After the adjacent contact 23 engages the contact 27, the movement of the lever 21 to the right is terminated and the thermostatic element 10 may continue its movement to the left, slipping over the sector 16. When the temperature is rising, the thermostatic element 10 moves to the right and the lever 21 is swung so as to bring the adjacent contact 23 into engagement with the stationary contact 26. This stationary contact 26 is connected by means of conductor 29 to the thermostatic element 12. After the contact 23 on the lever 21 engages the contact 26, the lever 21 again ceases its movement and the thermostatic element 10 slides over the stationary sector 16. The stops 18 prevent the thermostatic element 10 from moving completely away from the sector 16 in unusual circumstances.

It may here be emphasized that owing to the shortness of the lower arm of the lever 21 and the comparatively great length of the upper arm of this lever, it will be seen that the contacts 23 are brought into engagement with the appropriate contact 26 or 27 almost immediately after the temperature begins to rise, or the temperature begins to fall, respectively.

The result is that the common wire 24 is connected to the thermostatic element 11 during falling temperature, and to the thermostatic element 12 during rising temperature. The thermostatic element 11 operates between two stationary contacts 72 and 74, which reference numbers I select because these points may be engaged, by the thermostatic element 11 at temperatures of 72° and 74° F., for example, the thermostatic element 12 moves between two contacts 68 and 70, these members being selected for the same reason, that is the thermostatic element 12 may engage the contact 68 at a temperature of 68° F., and it may engage the contact 70 at a temperature of 70° F. That is, the contacts associated with the thermostatic element 11 define a higher range than those associated with the thermostatic element 12.

The contacts 72 and 68 are connected to a conductor 30 which I term the heat wire, and the contacts 74 and 70 are connected to a conductor 31, which I term the cold wire. These terms are used merely as an aid to explanation and are not intended to be limitative in any respect. In a typical installation, the conductor 24 when connected to the wire 30 by the thermostatic control completes a circuit which starts the heater or actuates mechanism to increase the supply of heat. When the circuit is made between the wire 24 and the wire 31, reverse operation occurs.

The operation of the device is as follows: It is assumed that the contacts 72, 74, 68 and 70 are set so that they are engaged by the associated thermostatic element at temperatures which correspond numerically to these indicia on the Fahrenheit scale. If the temperature is, for example 65°, and the heater is operating so that the temperature is increasing, then the thermostatic elements 11 and 12 are in their left hand position, that is, they are in engagement with contacts 72 and 68 respectively. Due to the movement of the thermostatic element 10 to the right under the influence of rising temperature, the lever 21 is brought into engagement with the stationary contact 26. Consequently, a circuit is completed from the battery 25, lever 21, contact 26, conductor 29, thermostatic element 12, contact 68 and heat wire 30. This corresponds to the setting of the heater for the supply of heat. The supply of heat, therefore, continues until the temperature passes through 68° to 70°. When the temperature 68° is reached, the thermostatic element 12 begins to move away from the contact 68 towards the contact 70. This does not affect the heater. The thermostatic element 12 engages the contact 70 at 70° F., completing a circuit through the thermostatic element 12 between the conductor 24 and the cold wire 31. This circuit actuates the heater so as to terminate or reduce its rate of supply of heat. The temperature nevertheless proceeds to overrun, that is, the temperature increases beyond 70° F.

During this increase, control still remains with the thermostatic element 12. At the end of the overrun, however, that is when the temperature begins to drop again, the thermostatic element 10, under the influence of the falling temperature, promptly connects the wire 24 to the contact 27 and throws control over to the thermostatic element 11. The degree of overrun varies in accordance with the building and heating installation.

There are two general cases, however, that is, the overrun may not reach the lower temperature, for example 72° F. of the higher range thermostatic element 11, or it may exceed that lower temperature. To consider the first case, when the overrun is terminated and control is thrown over to the thermostatic element 11, that element, the temperature being below 72°, is in engagement with the stationary contact 72 and the wire 24 is connected to the heat wire 30 so that the heater is started or its rate of supply of heat is increased immediately. Nevertheless due to the lag, the temperature continues to fall and eventually the temperature begins to rise again so that control is again thrown over to the lower setting thermostatic element 12.

In the case under discussion, this ordinarily will occur before the temperature of 70°, that is the high temperature of the low setting thermostatic element 12, is reached. Consequently, the wire 24 is connected to the cold wire 31 immediately when the changeover has been effected by the thermostatic element 10. It will thus be seen that in this case the temperature remains between the lowest temperature point of the thermostatic element 11 and the highest temperature point of the thermostatic element 12. Further in this case the heat is being supplied almost exclusively during the time the temperature is falling and practically no heat is supplied during the time the temperature is rising. These effects contribute to a lessening of overrun and to the attainment of a more equitable temperature, or a temperature which varies within much closer limits than heretofore attainable Under ideal circumstances the range of temperature permitted by the control coincides with the difference of temperature between the minimum setting of the higher range thermostat and the maximum setting of the lower range thermostat. In these circumstances, the temperature range lies between these settings and all heat is supplied during falling temperature, and no heat is supplied during rising temperature, so that the smallest temperature range is attained.

In the case of certain installations which have a higher overrun, due to one cause or another, the operation is somewhat modified. Thus to give a concrete example with the figures previously ascribed to the contacts 72, 74, 68 and 70, it is assumed that the temperature is 65° and is increasing. The thermostatic element 10 throws control to the thermostatic element 12. Since the temperature is below 68°, the thermostatic element is in engagement with the contact 68 and the heat wire 30 is connected to the wire 24. This corresponds to the supply of heat. When the temperature reaches 68° F. the thermostat 12 begins to move away from the contact 68, which does not affect the heating apparatus. When the thermostatic element 12 reaches the contact 70, the cold wire 31 is put into circuit with the wire 24 and the heater is stopped or curtailed.

The overrun will carry the temperature above 70° and in this specific instance above the temperature of 72°. During this overrun, the heater is stopped or damped. When the overrun terminates and the temperature begins to fall, control is then thrown by the thermostatic element 10 to the thermostatic element 11. Since the temperature is above 72°, the thermostatic element 11 is out of engagement with the contact 72. Consequently, the heater remains off or in curtailed condition and the temperature falls until 72° F. is reached whereupon the thermostat 11 engages the contact 72 and connects the conductor 24 to the heat wire 30 so that the heater is put into operation or is accelerated.

In this particular instance, the temperature will ordinarily continue to fall to a point below 70° F. As the temperature falls, the thermostatic element 11 maintains engagement with contact 72. When the heat supplied by this operation of the heater overcomes the tendency of the temperature to drop, the temperature will begin to rise. The slightest increase of the temperature will throw control over to the thermostatic element 12. Since the temperature is below 70°, the thermostatic element 12 is out of engagement with contact 70 so that the heating continues until the temperature of 70° is attained. When that occurs, the thermostatic element 12 comes into engagement with the contact 70 and the circuit is completed through the cold wire 31 so that the heater is terminated or curtailed.

The cycle just described is continued indefinitely, the temperature overrunning slightly below the maximum setting of the thermostatic element 12 and overrunning slightly the minimum setting of the thermostatic element 11. The heat is supplied during the cycle from the temperature 72° to the minimum temperature and up to a temperature of 70° again, that is it is supplied for the most part while the temperature is falling and to a relatively smaller extent while the temperature is rising. The distinctive manner in which heat is provided mainly while the temperature is falling minimizes the tendency to overrun to a remarkable degree. If any particular installation tends to overrun to an excessive degree, such tendency may be minimized by increasing the separation of the settings of the two thermostats 11 and 12. Such increase augments the proportion of the heat which is supplied during falling temperature and has the effect of decreasing the temperature range permitted by the control.

Figure 3:
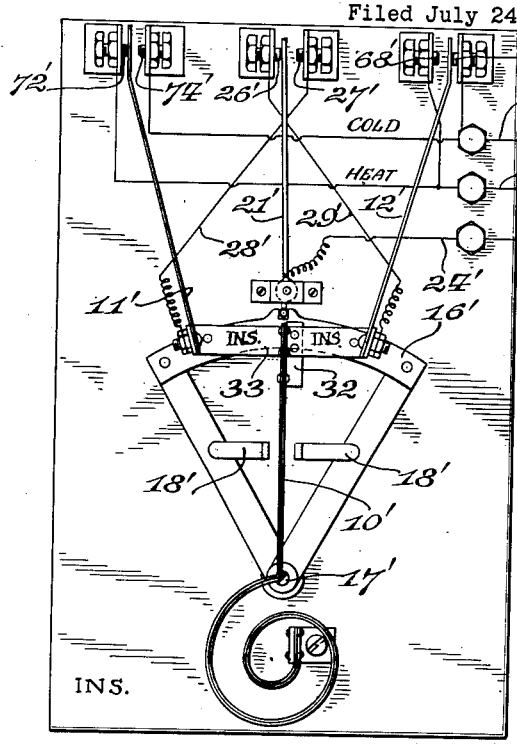
Fig. 3 is a front elevation of a further embodiment of my invention.
Figure 4:
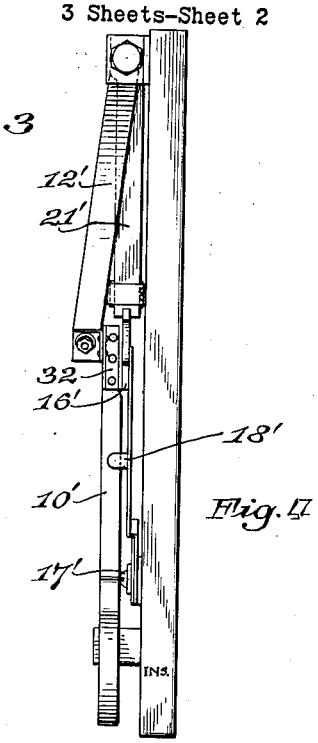
Fig. 4 is a side view thereof.

Referring to the embodiment of the invention illustrated in Figs. 3 and 4, it may be noted that the three thermostatic elements 10, 11 and 12 move simultaneously so that they may be replaced by a single thermostatic element 10' as shown in Figure 3. The thermostatic element 10' carries a friction plate 32 which is adapted to engage a sector 16' pivotally mounted at 17' and corresponding closely to the sector 16 in the first described embodiment of the invention. This sector cooperates with a lever 21' in exactly the same way as previously described so that this lever is brought into engagement by the contact 26' when the temperature is rising and is brought into engagement with the contact 27' when the temperature is falling. The lever 21' is connected to a conductor 24' which includes the battery 25'. The thermostatic element 10' carries a strip of insulation 33 upon which are mounted two flexible contact arms 11' and 12' respectively. These flexible arms fulfill the functions of the thermostatic elements 11 and 12 previously described.

The resilient arm 11' is adapted to engage contacts 72' and 74'. The resilient arm 12' is adapted to engage contact 68' and 70'. Again these reference numerals are employed to define an exemplary setting for the thermostatic control. That is, the resilient arm 11' will engage its contacts at the ends of a range of temperature which is higher than the range at which the arm 12' engages its contacts. The contact 27' is connected to the resilient arm 11' by means of a conductor 28'. The resilient arm 12' is connected by a conductor 29' to the contact 26'. The sector 16' or the arms which carry it may be provided with stops 18' to limit the freedom of movement of the thermostatic element 10' so as to maintain the resilient arms 11' and 12' at all times between their associated contacts. Arms 11' and 12' are long and are very resilient in comparison to the thermostatic element 10'. Consequently, the engagement of the arms 11' and 12' with their contacts will have no effect upon the normal movement of the thermostatic element 10'.

It will be obvious that when the temperature is falling, control will be thrown over to the arm 11' just as it was to the thermostatic element 11 in the previously described embodiment, and that when the temperature is rising, control will be thrown over to the resilient arm 12' just as it was thrown over to the thermostatic control 12 in the previously described embodiment. The same results are, therefore, obtained in connecting the wire 24' to the cold wire 31' and to the heat wire 30', as in the previously described embodiment.

Figures 5, 6:
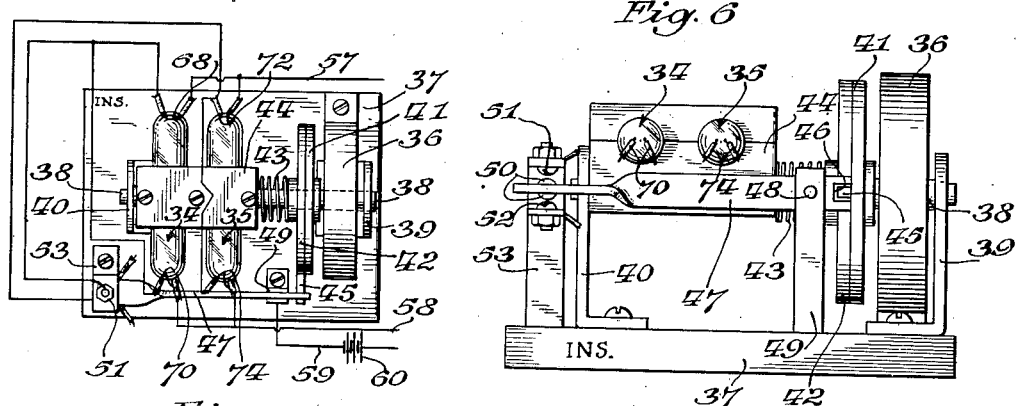
Fig. 5 is a plan view of a further embodiment of my invention.
Fig. 6 is a side elevation thereof.

Figs. 5 and 6 illustrate an embodiment of the invention in which mercury switches 34 and 35 are employed. Each switch includes a pair of contacts at each end and I have applied indicia to each pair of contacts corresponding to the exemplary temperatures at which they may become operative, these temperatures being 72°, 74°, 68° and 70°, corresponding to the indicia used in the previously described embodiments.

The thermostatic element may suitably comprise a coil 36 of bi-metallic strip, one end of the coil being secured to a base 37. The inner end of the coil 36 is rigidly secured to a shaft 38. The shaft 38, which is horizontal, has one end rotatably mounted in a bracket 39 and the other end rotatably mounted in a bracket 40, both brackets being mounted on the base 37. Rigidly mounted on the shaft 38 is a plate 41 with which a friction plate 42 is adapted to cooperate. The friction plate is yieldingly pressed toward the plate 41 by means of a spring 43 which bears against the friction plate and against an abutment 44 which may suitably be a block rigidly mounted on the shaft 38. The mercury switches 34 and 35 may suitably be carried in the block 44 at appropriate angles for operation in accordance with the temperatures desired for them. The friction plate 42 carries a projection 45 which is located in a slot 46 on the short end of a lever 47. The lever 47 is pivoted at 48 on a bracket 49 mounted on the base 37. At the other end the lever 47 carries contacts, 50, one of which is adapted to engage a contact 51 or a contact 52 in extreme positions of the lever 47. The contacts 51 and 52 are mounted by means of insulation upon a bracket 53 mounted on the base 37.

When the temperature is falling, the plate 41 is rotated in a clockwise direction as viewed from the right in Fig. 6, and consequently the friction plate 42 is rotated in the same direction and the lever 47 is swung so as to bring the adjacent contact and the lever 47 into engagement with the contact 52. In other words, the contact 52 corresponds to the contact 27 in the first described embodiment.

A rising temperature brings one of the contacts on the lever 47 into engagement with the contact 51. In other words, the contact 51 corresponds to the contact 26 of Fig. 1. The contact 51 is connected to one of each pair of contacts 68 and 70. The contact 52 is connected to one of each of the two contacts 72 and 74. The other of each pair of contacts 72 and 68 is connected to a wire 57 which is the heat wire. The other of each pair of contacts 74 and 70 are connected to a wire 58 which is the cold wire. The lever 47 is connected to a wire 59 which is the common wire and contains a battery 60.

The manner in which this device operates will readily be understood from consideration of the previously described embodiment. There has previously been described the manner in which the shaft 38 is rotated in one direction or the other by change of temperature to make circuit through the contact 51 when the temperature is rising, and through the contact 52 when the temperature is falling. When the contact 51 is operative, the temperature is rising and control is given to the mercury switch 34 which has the lower setting. When the temperature is falling, the circuit is made through the contact 52 and control is given to the switch 35 having the higher range. It will be understood that the electric switches 34 and 35 are angularly displaced so that they will be actuated to complete circuits at the appropriate temperatures.

Referring to the embodiment of the invention shown in Fig. 7, it is to be noted that this embodiment comprises two thermostatic elements 61 and 62. The thermostat 61 has a frictional contact with a sector 63 which controls a pivoted lever 64 in the manner previously described in connection with the pivoted lever 21. When the temperature is falling, the lever 64 is swung into engagement with the stationary contact 65. When the temperature is rising, it is moved into engagement with the stationary contact 66. A conductor 67 is connected to the lever 64 and to one side of a battery 87. The other side of the battery 87 is connected by means of conductor 88 to two resilient arms 92 and 93 which are mounted on and insulated from the plate 85 so as to project to the left and right therefrom as best seen in Fig. 7. Beneath the resilient arms 92 and 93 are mounted in insulated relation two contact arms 94 and 95. The contact arm 94 is connected to one end of the electromagnet 71, the other end of which is connected by a conductor 89 to the contact 66. The contact arm 95 is connected to one end of the electromagnet 69, the other end of which is connected by a conductor 73 to the contact 65.

The electromagnets 69 and 71 may be mounted in any suitable manner within a housing 90 in which the thermostatic element 62 is located. The magnets may, for example, be supported upon the plate 85 by means of brackets. The thermostatic element 62 operates between two contacts 75 and 76 which are connected to a heat wire 77 and cold wire 78 respectively. The thermostatic element 62 is connected to a common wire 79 which includes a battery 80'. The inner end of the thermostatic element 62 is rigidly mounted on a plate 80 which is pivoted for free motion upon a pin 81 carried by the housing 90.

The plate 80 carries two armatures 82 and 83 which are adapted to cooperate with the electromagnets 69 and 71 respectively. Consequently when the electromagnet 69 is energized, the thermostatic element 62 is thrown slightly to the left, as viewed in Fig. 7, and when the electromagnet 71 is energized, the thermostatic element 62 is thrown somewhat to the right as viewed in Fig. 7. The movements of the plate 80 in either direction are limited by set screws 84 carried on the plate 85 which is rotatably mounted upon the pin 81 as axis and is located behind the plate 80. The plate 85 is held frictionally into any position in which it is located, and it comprises a downwardly extending handle 86 whereby it may be moved to adjust the temperature for which the thermostat is set.

This embodiment of the invention differs from those of the preceding embodiments in that control is exercised by one pair of contacts 75, 76 instead of two pairs. I am enabled to use one pair of contacts in this embodiment of the invention because I displace the thermostatic element 62 to one side or to the other side in accordance with the prevailing change of temperature, that is, whether the temperature is rising or falling. Thus when the electromagnet 69 is energized and the thermostatic element 62 is thrown to the left, then this element will engage the contact 75 at the temperature 72°. When, however, the thermostatic element 62 is thrown to the right, it will not make engagement with the contact 75 until the temperature of 68° is reached. When thus swung to the right, the thermostatic element 62 will engage the contact 76 at 70°. When it is thrown to the left, it will not engage the contact 76 until the temperature of 74° is attained. The thermostatic element 62 is held in one extreme position or another, that is, with an abutment on the plate 80 in engagement with one or the other of the set screws 84, by means of a spring 91 which is connected to a pin 96 on the plate 85 and to the plate 80 adjacent the mounting of the thermostatic element 62. It will readily be seen in Fig. 7 that in passing from one extreme to the other, this spring passes the pivot 81 upon which both plates 80 and 85 are mounted.

The operation of this embodiment of the invention is as follows: If the temperature is falling, the electromagnet 69 is energized and the thermostatic element 62 is rendered of higher setting, that is, it completes a circuit through the heat wire at the minimum higher range temperature, which in the examples is 72°. When, however, the temperature is increasing, the electromagnet 71 is energized and the thermostatic element 62 is moved towards the cold contact 76. Consequently, since the temperature is rising and the thermostatic element is moving towards that contact 76, and it contacts it earlier than would have been the case had the mechanical displacement of the thermostatic element 62 not been made.

It will readily be understood that the contact 75 and 76, and the other contacts are adjustable and that these contacts may be brought into such a position that the thermostatic element 62 is moved from one to the other by the displacement due to the magnet 69 and 71. Thus, for example, if the temperature is falling, the thermostatic element 62 is thrown towards the left. When the temperature is below 72°, the wire 77 is in circuit and heat is produced. The overrun continues and is finally terminated by the heat produced and the temperature then rises, effecting the energization of the electromagnet 71 and swinging of the thermostatic element 62 to the right. This movement to the right may be sufficient to bring the thermostatic element 62 into engagement with the contact 76 so that the cold wire 78 is energized and the heating is terminated or curtailed. When operating in this way, the ideal condition is attained, that is the condition in which the heating is done exclusively during falling temperature and is terminated or curtailed during the period of rise in temperature.

The resilient arms 92 and 93 and the arms 94 and 95 are arranged to cut the battery 87 out of circuit unless when the same is being actually used. Thus, the resilient arms 92 and 94 are shown in engagement in Fig. 7, whereas the arms 93 and 95 are out of engagement. No current is, therefore, flowing from the battery since the circuit of the magnet 69 is open between the arms 93 and 95 and the circuit of the magnet 71 is open at the contact 66. When the lever 64 moves into engagement with the contact 66, the circuit of the electromagnet 71 is energized, owing to the fact that the arms 92 and 94 are in engagement. This engagement persists until after the plate 80 has swung through the dead center position, after which it opens, the complete movement of the plate 80 in the clockwise direction being completed by the spring 91. At the end of the movement, the arms 92 and 94 are out of engagement and the arms 93 and 95 are in engagement, but the battery 87 is out of circuit since the lever is in its left hand position. The resilient arms 92 and 93 may be provided with contact pieces 97 at their outermost ends whereby they may be engaged by suitable portions of the swinging plate 80.

While the invention has been described in connection with three wire control systems, that is systems having a heat wire, a cold wire, and a common return wire, it is usually applicable to two wire control systems which include, for example, a heat wire and a return wire. In known two-wire systems the heat may be on when the thermostat engages a contact and off when it separates from the contact. If the cold wire 31 and lower contacts 70 and 74 are omitted from the apparatus shown in Fig. 1, a two wire control system results in which the thermostat 11 controls during falling temperature and the thermostat 12 controls during rising temperature. The same considerations apply to the embodiments of Figs. 3 and 4, and Figs. 5 and 6. In the case of the embodiment of Fig. 7, similar results may be obtained by omitting the cold wire 78 and contact 76.

Although the invention has been described in connection with the specific details of a preferred embodiment thereof, it must be understood that such details are not intended to be limitative of the invention except in so far as set forth in the accompanying claims.

I claim:

1. In combination, a pair of thermostatic switches, a control circuit connected to both switches, a thermostatic element, switch means actuated by said thermostatic element for connecting said circuit to one switch of the pair when the temperature is falling and to the other switch of the pair when the temperature is rising.

2. In combination, a thermostatic element, a second thermostatic element, a contact adapted to be engaged by said second element, means associated with said second thermostatic element for moving it bodily to change its relation to said contact, and means actuated by the first said thermostatic element when the temperature starts to rise and starts to fall for operating said associated means to effect bodily movement of said second thermostatic element.

3. In combination, a thermostatic element, a pair of contact members carried thereby, means insulating said contact members from each other, contacts adapted to cooperate therewith, a conductor, and means responsive to the initiation of rise and fall of temperature for connecting said conductor selectively to one contact member or the other contact member.

4. In combination, a thermostat set for one temperature range, a thermostat set for another range, circuit changing means adapted to render either of said thermostats operative, and means responsive to the rising or falling of temperature for controlling said circuit changing means.

5. In combination, a thermostat, a pair of contacts adapted to cooperate therewith, a second thermostat, a second pair of contacts adapted to cooperate therewith, a thermostatic element, a conductor, a switch adapted to connect the conductor to one thermostat or to the other, and means having a frictional contact with said element adapted to operate the switch when the temperature begins to fall or rise.

6. In combination, a pair of thermostatic switches, a control circuit connected to both elements, a thermostatic element, switch means having a frictional engagement with said thermostatic element for connecting the circuit to one of the first said pair of thermostatic switches when the temperature begins to rise, and to the other switch of said pair when the temperature begins to fall.

7. In combination, a thermostatic element, a second thermostatic element, electromagnetic means associated with the last said thermostatic element for changing the setting thereof, switching means for controlling said electromagnetic means, and means having a frictional engagement with the first said thermostatic element for actuating the switching means when the temperature starts to fall and starts to rise.

8. In combination, a thermostatic element, a pair of flexible contact arms carried thereby, fixed contacts adapted to cooperate therewith, a conductor, a switch adapted to connect said conductor selectively to one of the flexible arms, and means having a frictional engagement with said thermostatic element for actuating the switch in one direction when the temperature starts to fall and in the other direction when the temperature starts to rise.

9. In combination, a thermostatic element, a pair of switch members movable therewith in response to temperature change, a conductor, switching means adapted to connect said conductor to one switch member or the other, and means having a frictional connection with said thermostatic element for actuating said switching means when the temperature starts to rise and when the temperature starts to fall.

10. In combination, temperature responsive means, a pair of switching means actuated thereby, switching means for rendering either of said pair of switching means operative and the other inoperative, and means immediately responsive to the initiation of rise and fall of temperature for actuating last said switching means.

EDWARD L. ALDWORTH.